Feb. 13, 1962          G. P. DIX          3,021,273

SUBSURFACE CONTAINMENT FOR NUCLEAR POWER REACTORS

Filed Aug. 11, 1958          3 Sheets-Sheet 1

INVENTOR.
GEORGE P. DIX

BY Benjamin G. Weil

ATTORNEY

INVENTOR.
GEORGE P. DIX
BY Benjamin S. Weil
ATTORNEY

United States Patent Office 3,021,273
Patented Feb. 13, 1962

3,021,273
SUBSURFACE CONTAINMENT FOR
NUCLEAR POWER REACTORS
George P. Dix, Baltimore, Md., assignor to Martin-Marietta Corporation, a corporation of Maryland
Filed Aug. 11, 1958, Ser. No. 754,324
11 Claims. (Cl. 204—193.2)

This invention relates generally to a device for containing transient efflux from a source of condensible fluids and particularly to a containment device suitable for use with nuclear reactors, especially reactors of the pressurized-liquid type.

The degree of hazard associated with the failure of vessels containing fluid material is partly dependent upon the nature of the fluid and the rate at which it is expressed into the environment. In nuclear reactor incidents, activation products, nuclear fuel, aerosols, fission products and missiles may be released from the reactor core. The problem of containing these materials becomes most serious in pressurized-liquid type reactors because of the large amount of high-pressure vapor generated during malfunction. This vapor disperses radioactive matter in the form of an air-borne cloud.

During reactor excursions a large thermal energy release of several hundred megawatt-seconds may occur in a very short time interval, causing fuel elements to melt or fail, with the coolant attaining a resultant high temperature and high pressure beyond the design parameters of the reactor system. The ability of the coolant to remove the excess heat from the core would thus be impaired and the admixture of incident materials, comprising radioactive substances and coolant, would then be expelled from the system through regions damaged by thermomechanical action. Reactor failure might also be caused by a spontaneous primary coolant loop rupture. The coolant is released under operating temperature and pressure. In the absence of adequate coolant the core might reach excessive temperatures, causing fuel element meltdown. Again an admixture of vapor, fuel, and fission products might be released. Other incidents requiring containment are possible such as pyrophoric metal reactions. Pyrophoricity is generally spontaneous and is not uncommon among metals in an elemental state such as uranium, plutonium, and zirconium. The resultant fire and smoke distributes aerosols which are biologically toxic. Violent chemical reactions of non-pyrophoric type involving for example, sodium coolant and zirconium cladding, may also operate to liberate dangerous incident products.

The nature of reactor failures as described above requires that several basic features be provided in an adequate containment device, including sufficient net volume to retain a given volume of vapor at a given pressure; means to counteract pressure surges and possible shock waves; retentive fluid-impermeable design; and the usual biological shielding for personnel.

Conventionally, nuclear containment structures consist of steel vapor shells of spherical, cylindrical, ellipsoidal or hemispherical configuration. Additional external and internal structure is required for adequate support in most cases, and to insure strength and integrity of the shell such that incident materials will be completely contained. In general, incident radioactive products of reactor malfunction can be released to the atmosphere by three typical containment shell failures. First, large internal pressure surges can cause rupture or fissuring of the containment vessel at structural zones of weakness such as apertures, joints, and welded areas. Second, shock waves generated by large energy releases can result in fissuring or fracturing of a containment vessel. Third, shell punctures can be caused by internal missiles traveling at high momentums either horizontally or vertically. Consequently, it is highly desirable to reduce the probability of such failure, and increase the reliability of the vapor container. Vapor shells are necessarily large so as to afford sufficient volume into which vaporized incident products may expand without producing an internal pressure greater than 25 to 50 pounds per square inch. The cost of fabricating, transporting and installing these large steel shells is quite high.

It is the purpose of this invention to provide a relatively inexpensive and simple containment device for nuclear reactors which will effectively retain incident products. This device may be wholly fabricated at the reactor site from local construction materials, thus eliminating the need for transporting massive components from the point of manufacture to the construction area. Further, this containment system occupies less volume than heretofore necessary for such structures and does not require a vapor shell. Also, it is designed to be impervious to missiles, save those traveling in a substantially vertical direction.

According to the present invention part or all of the reactor primary system is positioned in an underground chamber or pit which is lined on all sides with fluid impermeable material. An aggregate of heat-conducting particles is placed in the pit so as to surround the contained system, hereinafter referred to as the reactor, although it may consist of the whole primary loop. These particles provide a large surface area for condensing fluids generated during a primary system failure. Both condensed and any uncondensed substances are retained by the fluid impermeable lining of the pit. The mechanical effects on the reactor of pressure surges and shock waves are mitigated by providing particle-free or void regions adjacent the reactor. Vapor instantaneously released into these voids dissipates part of its energy by rapid expansion. The pressure front then diffuses through interstices in the particle aggregate and decreases in magnitude in proportion to the diffusion and condensation rate. Effective counterpressures are exerted by the dead weight and resiliency of the particles. Shock waves could conceivably be generated by certain types of system failures, and they must be absorbed and distributed as evenly as possible. The aggregate provided around the reactor pressure vessel serves to attenuate, diffuse and reflect shock waves without concentrating additive overpressures. As with pressure waves, the inertia and resiliency of the particle mass operate as a counterpressure. Also, shock waves are swiftly transmitted through the aforementioned void regions, and dissipate the major part of their energy at a distance from the reactor. A small negative pressure may be maintained within the pit to offset prompt positive pressures to a minor extent. This is effected by a vacuum pump connected to a pipe injected into the particle aggregate. An automatic valve would close this pipe in the event of any malfunction.

By locating the reactor in a pit, it is protected from damage by missiles approaching from the sides. In the same manner, internal missiles, i.e., those produced within the pit, may exit only in a vertical direction. The containment structure also functions as a partial biological shield by attenuating radiation from the reactor and placing significant distances between radioactive components and operations personnel.

The present invention is applicable to all types of reactors, for example, graphite, both gas and liquid cooled; pressurized water; boiling water; sodium cooled; organic moderated; and homogeneous reactors. The reactor itself, however, forms no part of this invention. In all these reactors there exists a certain probability that a primary system failure will occur at any time during operation, deriving from spontaneous failure or from the simultaneous coincidence of a number of failures having an additive effect.

For a better understanding of the invention, reference it made to the description below and to the drawings in which.

Figure 1:
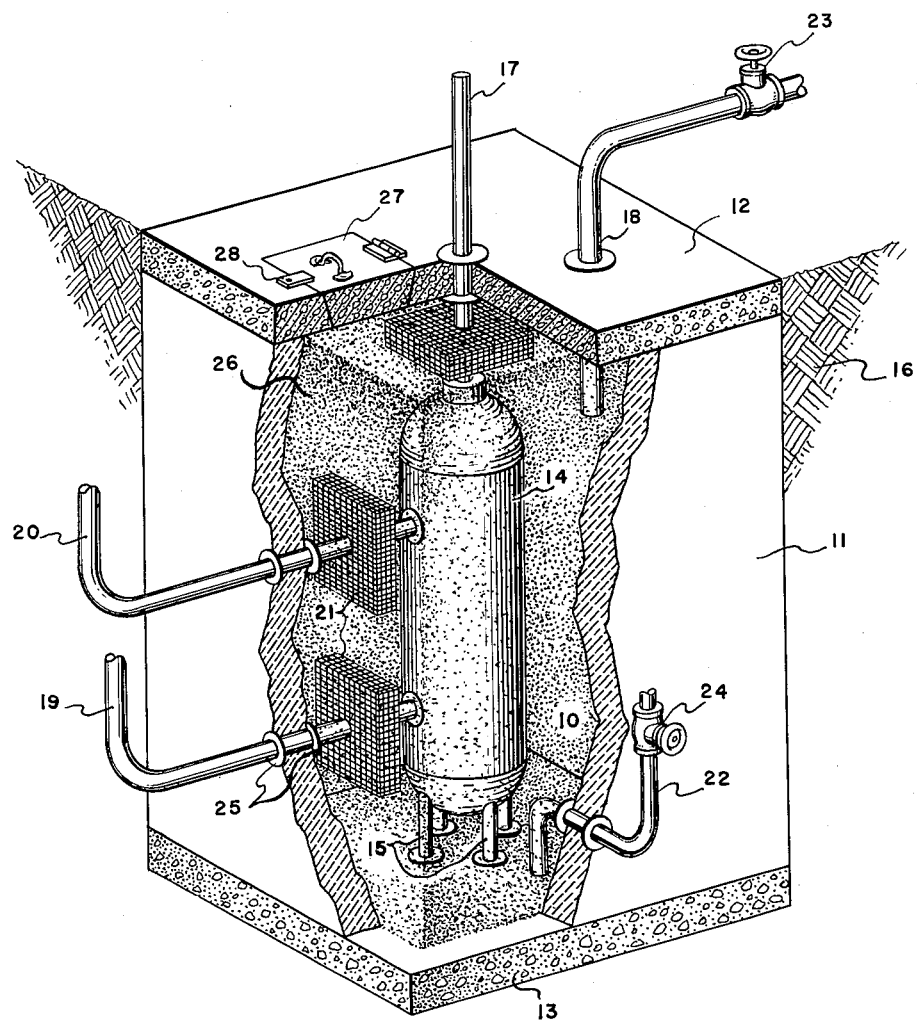
FIGURE 1 is a cutaway perspective view of one embodiment of the containment structure and a reactor pressure vessel.

In FIGURE 1, an underground chamber, designated generally at 10, is defined by four side walls 11, top wall 12 and bottom wall 13. Positioned centrally in the chamber is a reactor pressure vessel 14 having vertical supports 15 connected to bottom wall 13. Both bottom wall 13 and top wall 12 are formed of poured concrete. Side walls 11 of compacted bentonite, a fluid-impermeable clay, are built up against the surrounding ground 16. The compacted bentonite and concrete act as fluid barriers, preventing liquids, gases or vapors from entering or leaving chamber 10. Reactor control mechanism 17, and conduit 18 project through wall 12. The lower portion of conduit 18 communicates with the atmoshpere in chamber 10, and the upper portion external of wall 12 is connected to a vacuum pump (not shown) by means of which chamber 10 is evacuated so as to provide a negative pressure therein relative to ambient pressure. Coolant water is transported to reactor 14 in conduits 19 and 20, the inlet and outlet, respectively, which extend from chamber 10 through one of the side walls 11. Three wire screen boxes as at 21 which form reticular enclosures are placed adjacent pressure vessel 14 on conduits 19 and 20 and control mechanism 17. Liquid incident products and seepage water are pumped from the bottom of chamber 10 by means of conduit 22 (pump not shown). Automatic valves 23 and 24, in conduits 18 and 22, respectively, shut off in the event of reactor malfunction. Flanges as at 25 are provided on all conduits leading from chamber 10, one on either side of the chamber wall, to act as seals and to deflect any steam generated within chamber 10 by reactor failure. The remaining space in chamber 10 is filled with quartz gravel 26. Screen boxes 21 retain gravel particles 26 and thereby maintain voids in the particle aggregate adjacent reactor 10 into which high velocity fluids may expand and be rapidly transmitted away from reactor 14. Access to chamber 10 and reactor 14 is afforded through hatch 27, a removable section of wall 12. When closed, hatch 27 is secured by pivotally mounted bar 28.

Although quartz gravel has been specified above for particles 26, other substances can be used. The particle material should be stable in air since chemical reaction products, such as oxides, on the surfaces of the particles will act as a thermal barrier and decrease the condensing effectiveness of the particles. In humid environments, most metals gradually become coated with a layer of oxide. However, on aluminum, for example, this oxide layer will be quite thin and not seriously affect the thermal characteristics of the aluminum particles. According to the atmosphere in the pit, then, various materials may be used. Ideally, the particles should have a relatively high thermal conductivity whereby fluids may be condensed in the shortest time possible. It has been found, however, that a comparatively small volume of particles having a reasonable thermal conductivity will provide adequate condensing surface, with the surprising result that low cost materials which occur naturally may be used to advantage. In Table I are listed typical substances which would be suitable in a particle aggregate.

Chamber walls of clay or concrete have been demonstrated to function adequately even under conditions of a maximum credible nuclear incident. Examples of suitable fluid-impermeable clays are bentonite and montmorillionite. In their stead mixed clays may serve. These materials and concrete seal against meteoric water, ground water, air and internal incident products. Moreover, some clays, like montmorillionites, are particularly desirable due to their ion exchange characteristics. Rubber or asphalt may also be used for walls 11. In localities where the ground is loose packed or where there exists a strong artesian head, walls 11 may be reinforced in any suitable manner, for example, with concrete, to prevent water seepage and cave-in. Also, a substructure under wall 13 may be constructed to prevent settling of the container into the ground as occurs in permafrost areas.

TABLE I

*Conductivity of certain materials*

| Substance | Temp., °C. | Conductivity, cal. cm.² × cm. × sec. |
|---|---|---|
| Aluminum | 18 | 0.50 |
| Brass | 17 | 0.26 |
| Copper (pure) | 18 | 0.92 |
| Iron (pure) | 18 | 0.16 |
| Steel | 18 | 0.12 |
| Quartz (perpendicular to axis) | R.T. | 0.02 |
| Sandstone | R.T. | 0.01 |

The necessary vapor volume is determined by the reactor system operating temperature, pressure and volume, and also by the excursion characteristics of the reactor. This can be directly related to the energy release postulated for the excursion and the amount of liquid available for evaporation. Total containment volume is a function of reactor size, vapor volume and the dimensions of the aggregate particles. It is desirable that these particles be of spherical configuration although particles of other shapes may be used. Spherical particles are preferred since they possess the largest possible surface area to volume ratio.

Heat liberated at the surface of the particles is absorbed at a rate dependent upon, inter alia, particle size, thermal conductivity of the particle material, and the condensation coefficient. The rate at which the particle material is able to absorb heat will determine the number of spheres required since the entire process must occur in an extremely short time if shock effects are to be minimized.

Figure 2:
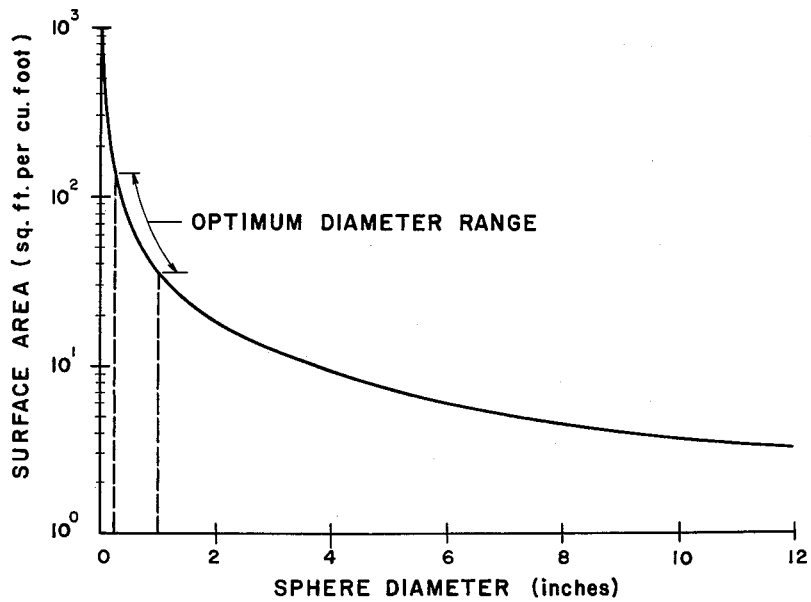
FIGURE 2 is a plot of sphere diameter vs. sphere surface area.

In an assemblage of uniform spheres the total surface area increases as the sphere diameter decreases. FIGURE 2 shows surface area (ft.²/ft.³) as a function of sphere diameter. Interstices between the particles should be large enough to facilitate the transmission of vapor away from the point of vapor release. In an aggregate of spheres of equal diameters the percentage void volume of total volume is 48% for loosest packing and 26% for densest packing. A practical gravel size range for uniform gravel necessary to obtain optimum void volume is found to be ¼" to 1" diameter. The density of quartz gravel in the loosest packing state and densest packing state is 86 lbs./ft.³ and 122 lbs./ft.³, respectively, as compared to 165.6 lbs./ft.³ for solid quartz.

An analysis of how particle diameter and conductivity affect the time needed to condense the steam expressed from a particular pressurized-water reactor after excursion is presented below. The analysis was made for quartz particles and aluminum particles having a spherical configuration.

Assumptions made in the analysis are as follows:

(1) The containment structure will be designed to withstand a pressure of 50 p.s.i.a.

(2) The condensation phenomena occurs instantaneously i.e., the only time restriction is that imposed by conduction of heat through the sphere.

(3) The entire process occurs sufficiently fast that there is no buildup of a liquid film on the surface of the spheres.

(4) The spheres are uniformly packed with a void fraction of 30%.

The particular reactor considered in this analysis is disclosed in the copending application of Nagey et al., S.N. 684,501, entitled "Transportable Nuclear Reactor Power Plant," filed September 17, 1957, now abandoned, hereinafter referred to as the MPR. The amount of heat to be removed was calculated on the basis of a rise in the temperature of the MPR primary loop water from 510° F. at 2000 p.s.i.a. to saturation, 636° F., followed by a 100 millisecond release involving 410 megawatt-seconds of energy. Since the final conditions were assumed to be saturated steam at 50 p.s.i.a., the amount of steam formed was 1208 pounds, and the heat liberated was $1.12 \times 10^6$ B.t.u. This value is shown on FIGURE 3 as a horizontal line.

The temperature distribution in a sphere versus time was obtained from the following equation:

$$\frac{T-T_0}{T_i-T_0} = \frac{2Ua^2}{r} \sum_{n=1}^{\infty} \frac{e^{-K\alpha_n^2 t}}{a^2\alpha_n^2 + aU(aU-1)} \cdot \frac{\sin \alpha_n r}{\sin \alpha_n a}$$

where:

$T_i$=initial sphere temperature (70° F.)
$T_0$=steam temperature (281° F.)
$U=h/k$
$h$=condensation coefficient (2000 B.t.u./hr.-ft.$^2$—° F.)
$k$=thermal conductivity
$a$=radius of sphere (feet)
$K$=thermal diffusivity
$t$=time (seconds)
$r$=radius of sphere (variable)
$\alpha_n$'s are the roots of:

$$a\alpha_n \cot a\alpha_n + Ua - 1 = 0$$

It was determined that essentially all of the sphere was available for heat absorption in 0.01 second for aluminum spheres and approximately 0.50 second for the quartz spheres.

The integrated form of Equation 1 was used to determine the amount of heat removed by a single sphere versus time:

$$\frac{H_t}{H_\infty} = 1 - \sum_{n=1}^{\infty} \frac{6a^2 U^2 e^{-\alpha_n^2 Kt}}{a^2\alpha_n^2[a^2\alpha_n^2 + aU(aU-1)]}$$

$H_t$=heat absorbed in time
$H_\infty$=heat absorbed in an infinite time

Figure 4:
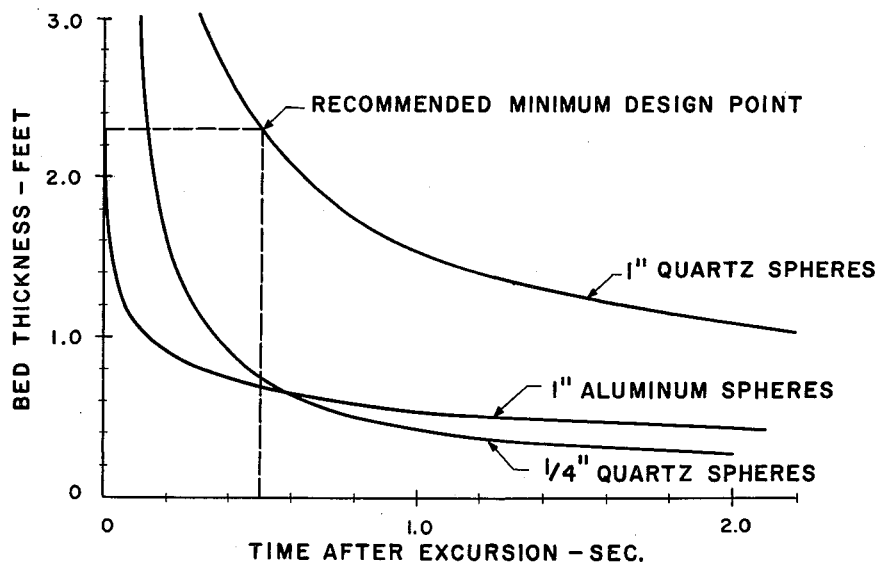
FIGURE 4 is a plot of particle bed thickness required to remove heat stored in the MPR primary loop vs. time after excursion for quartz and aluminum spheres of different diameters.
Figure 3:
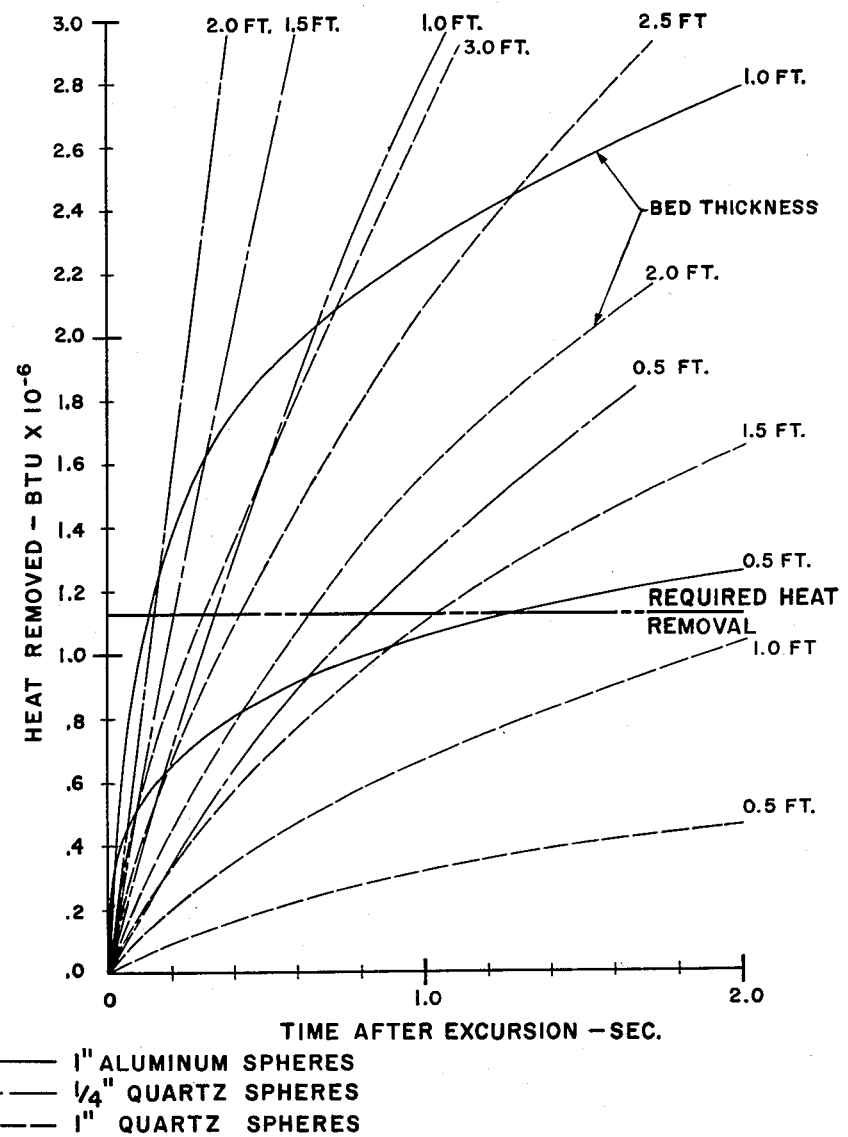
FIGURE 3 is a plot of heat removed by aluminum and quartz spheres of different diameters for different bed thicknesses vs. time after excursion.

FIGURE 3 is a plot of $H_t$ versus time for ¼" and 1" quartz and 1" aluminum spheres. Calculations were performed for ¼" aluminum spheres but they proved so efficient that they could not be plotted on the same scale. FIGURE 4 presents a cross-plot of the intersection of the curves with the horizontal line in FIGURE 3. It represents the minimum sphere bed thickness required to remove the heat versus time after the incident. One-half of one second are arbitrarily selected as the maximum length of time in which condensation should take place since it was believed that a much longer period would result in unduly large forces.

As a check, the condensation coefficient needed to effect the required heat transfer in 0.5 sec. for a bed thickness of 3.0 feet was determined to be 140 B.t.u./hr.—ft.$^2$—° F.

A coefficient of this magnitude is normally encountered for condensation in the presence of a non-condensable gas and presents no problem.

For an excursion of the type described above approximately 10,500 cubic feet of net interstitial air volume would be required for containment at 50 p.s.i.a. Since the interstitial volume of gravel of uniform size in a loose packing state is half the gravel volume, 21,000 cubic feet of gravel would provide the necessary containment volume. Adding to this the volume of the MPR, 2,430 cubic feet, results in a gross chamber volume of 23,430 cubic feet. This may be approximated by using a chamber 40 by 25 by 25 feet, having a gross volume of 25,000 cubic feet, a gravel volume of 22,570 cubic feet, and a net interstitial air volume of 11,285 cubic feet.

While one embodiment of the present invention has been described in detail, it is understood that modifications are possible which would be apparent to persons skilled in the art without departing from the spirit of the invention or the scope of the appended claims.

I claim:

1. In combination with a nuclear reactor enclosed within a pressure vessel, means for containment of the products of accidental reactor excursion from said pressure vessel comprising an outer wall member surrounding and spaced from said pressure vessel and defining a chamber of substantial volume between said pressure vessel and said wall member, reticular enclosures located in said chamber adjacent to said pressure vessel, and a filling of substantially spherical particles of heat conducting solid material in said chamber, said reticular enclosures defining void spaces by excluding said filling material, the volume within said void spaces and within interstices between said spherical particles containing only gas.

2. The combination described in claim 1 including means for maintaining said chamber at a negative pressure with respect to ambient pressure.

3. The combination as described in claim 1 wherein said particles of heat conducting solid material have an average diameter of 0.25 to 1.0 inch.

4. The combination as described in claim 1 wherein said outer wall member surrounding and spaced from said pressure vessel is made of concrete.

5. The combination as defined in claim 1 wherein said particles are quartz gravel.

6. In combination with a nuclear reactor enclosed within a pressure vessel, means for containment of the products of accidental reactor excursion from said pressure vessel comprising top and bottom walls of concrete and side walls of at least one fluid impermeable material, said walls surrounding and spaced from said pressure vessel to define a chamber of substantial volume between said pressure vessel and said wall members, reticular enclosures located in said chamber adjacent to said pressure vessel, a filling of substantially spherical particles of heat conducting solid material in said chamber, said reticular enclosures defining void spaces by excluding said filling material, the volume within said void spaces and within interstices between said spherical particles containing only gas, means to maintain a negative pressure in said chamber with respect to ambient pressure, and means to remove accumulated liquids from the bottom of said chamber.

7. The combination as described in claim 6 wherein said side walls are made from bentonite clay.

8. The combination as described in claim 6 wherein said particles are made of montmorillionite clay.

9. The combination as described in claim 6 wherein said particles are quartz.

10. The combination as described in claim 6 wherein said particles are sandstone.

11. The combination as described in claim 6 wherein the average diameter of said particles is 0.25 to 1.0 inch.

(References on following page)

References Cited in the file of this patent

UNITED STATES PATENTS

| | | |
|---|---|---|
| 2,830,944 | Wigner et al. | Apr. 15, 1958 |
| 2,853,624 | Wigner et al. | Sept. 23, 1958 |
| 2,861,034 | Wigner et al. | Nov. 18, 1958 |
| 2,921,007 | Spinrad | Jan. 12, 1960 |
| 2,936,273 | Untermyer | May 10, 1960 |
| 2,940,916 | Sleeper | June 14, 1960 |

OTHER REFERENCES

AECD-3731, Army Package Power Reactor, Oct. 14, 1955, pp. 58-81.

AECU-3779, Engineering Study on Underground Construction of Nuclear Power Reactors, Apr. 15, 1958, pp. 12-21.

ANL-5781, Hazard Summary Report on the Experimental Boiling Water Reactor, Nov. 25, 1957, pp. 14, 15, 23-25, 93, 97-99.